Sept. 20, 1966  E. C. McDONALD ETAL  3,273,982
GAS MIXING METHOD AND APPARATUS
Original Filed March 24, 1961  5 Sheets-Sheet 2

INVENTORS
EDWIN C. McDONALD,
& FRANKLIN E. STEPHENS
BY
WATTS, EDGERTON, PYLE & FISHER
ATTORNEYS

Sept. 20, 1966 E. C. McDONALD ETAL 3,273,982
GAS MIXING METHOD AND APPARATUS
Original Filed March 24, 1961 5 Sheets-Sheet 3

INVENTORS
EDWIN C. McDONALD
& FRANKLIN E. STEPHENS
BY
WATTS, EDGERTON, PYLE & FISHER
ATTORNEYS

Sept. 20, 1966 E. C. McDONALD ETAL 3,273,982
GAS MIXING METHOD AND APPARATUS
Original Filed March 24, 1961 5 Sheets-Sheet 4

INVENTORS
EDWIN C. McDONALD,
& FRANKLIN E. STEPHENS
BY
WATTS, EDGERTON, PYLE, & FISHER
R.D. Watts
ATTORNEYS

United States Patent Office 3,273,982
Patented Sept. 20, 1966

3,273,982
GAS MIXING METHOD AND APPARATUS
Edwin C. McDonald and Franklin E. Stephens, Cleveland, Ohio, assignors to Republic Steel Corporation, Cleveland, Ohio, a corporation of New Jersey
Continuation of application Ser. No. 98,186, Mar. 24, 1961. This application Feb. 24, 1965, Ser. No. 440,056
7 Claims. (Cl. 48—180)

This application is a continuation of our copending application, Ser. No. 98,186, filed on Mar. 24, 1961, now abandoned.

This invention relates generally to the art of mixing gases and is particularly concerned with a new method of, and new apparatus for, continuously mixing a plurality of gases of initially different pressures in substantially constant predetermined proportions, and in varying quantities as demanded by the devices which use the gas mixtures.

Since long prior to this invention, a need has existed in certain industries for a method of, and means for, mixing a plurality of gases of initially different pressures and automatically maintaining the mixture at substantially a predetermined pressure, and with a substantially uniform composition throughout a wide range of variation in the required volume of the mixture. An example of such industries is the steel industry where it is desired continuously to produce a mixed gas of substantially uniform composition from high pressure natural gas and atmospheric air, with or without the addition of coke oven gas, and under conditions where the volume of the mixed gas required varies from a very small amount during certain periods of time, such as over weekends when production is restricted, to a very large amount at other times, such as when the mill is operating at full production rate.

The present invention aims to satisfy that long-standing need. It is predicated on the conception of utilizing the energy which is released by the expansion of a gas under pressure to compress another gas and, by controlling the initial and eventual pressures of the two gases, to obtain a mixture of the gases which can be controlled as to quantity, pressure and composition at all times despite the demands made for varying quantities of the mixed gases. The aims of this invention are attained by a new combination of steps and elements, embodiments of which are disclosed in the following specification and in the drawings accompanying and forming a part hereof in which:

Figure 1:
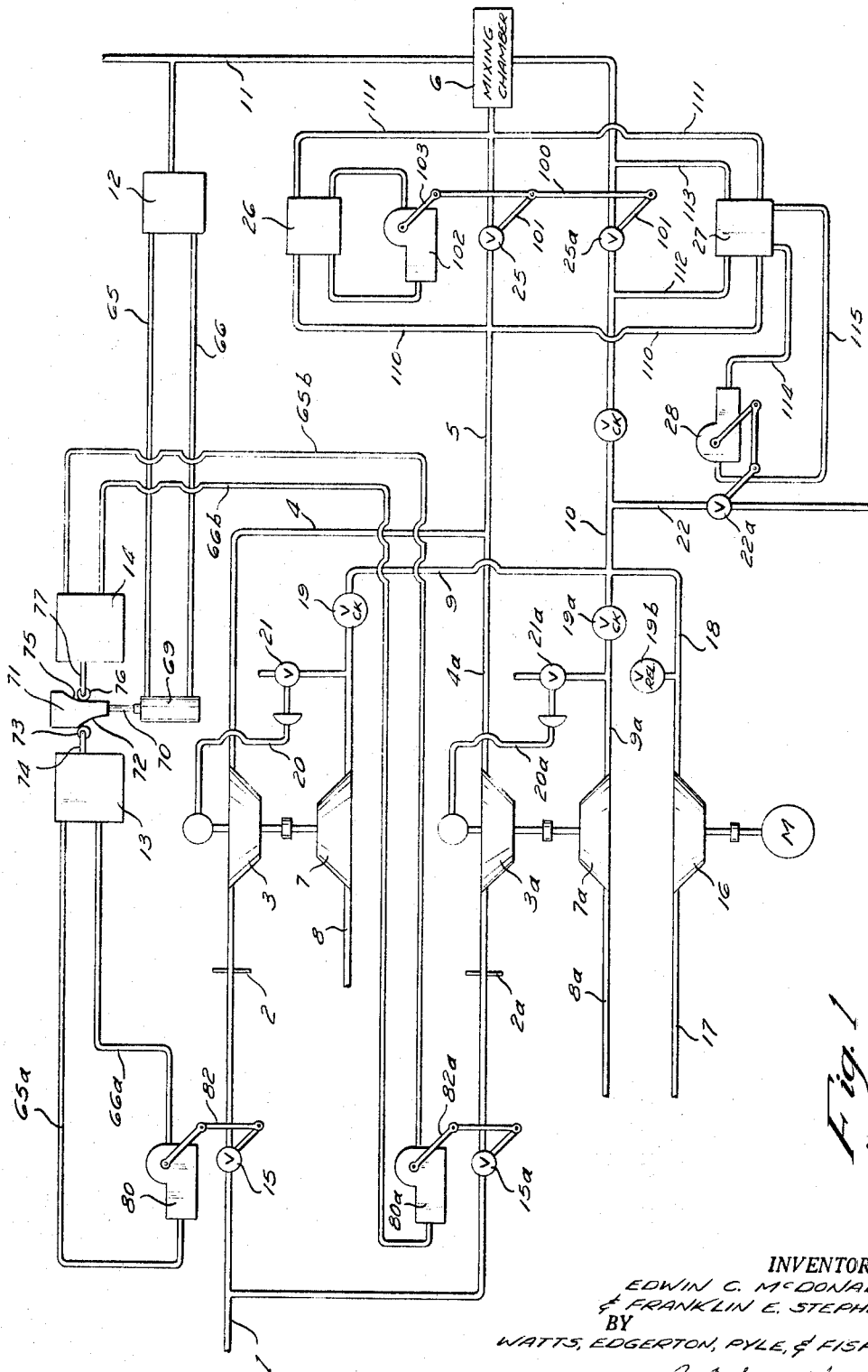
FIGURE 1 is a fragmentary, schematic diagram of a system embodying the present invention.
Figure 2:
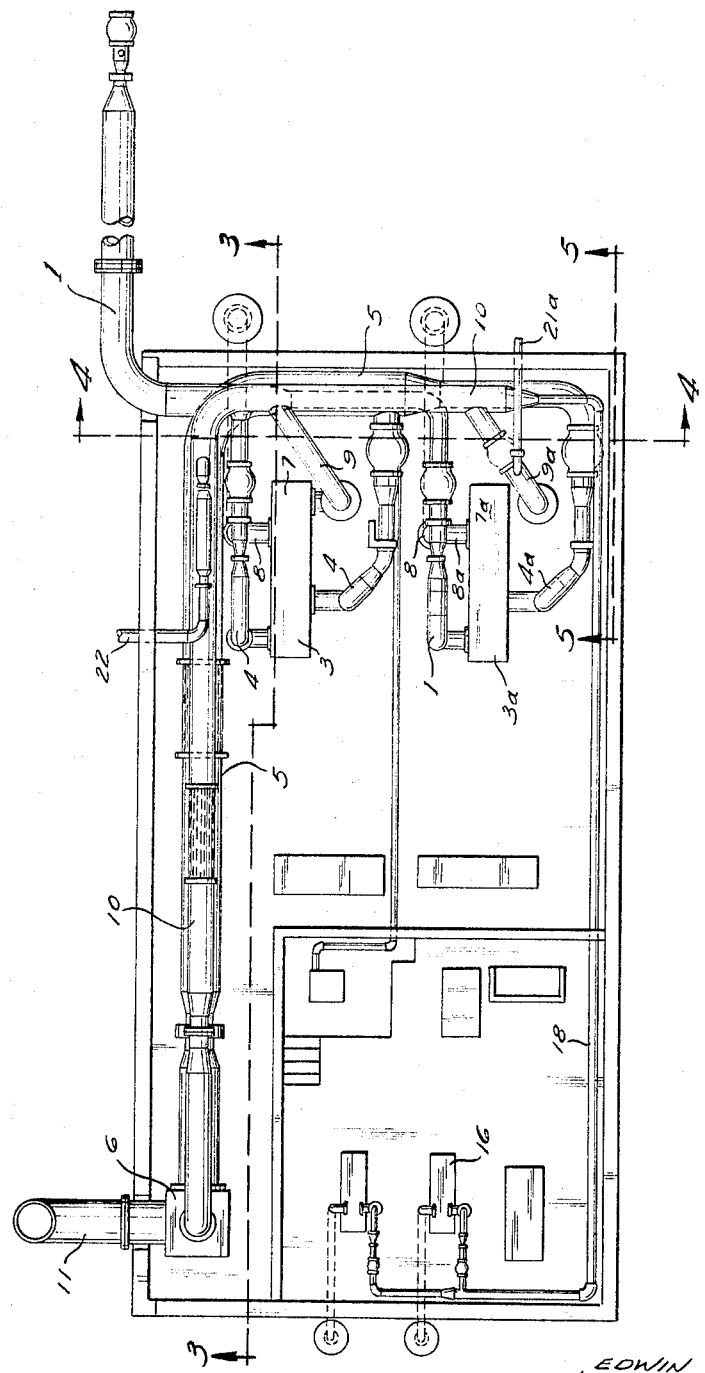
FIGURE 2 is a top plan view of a commercial installation of the system of FIGURE 1.
Figure 3:
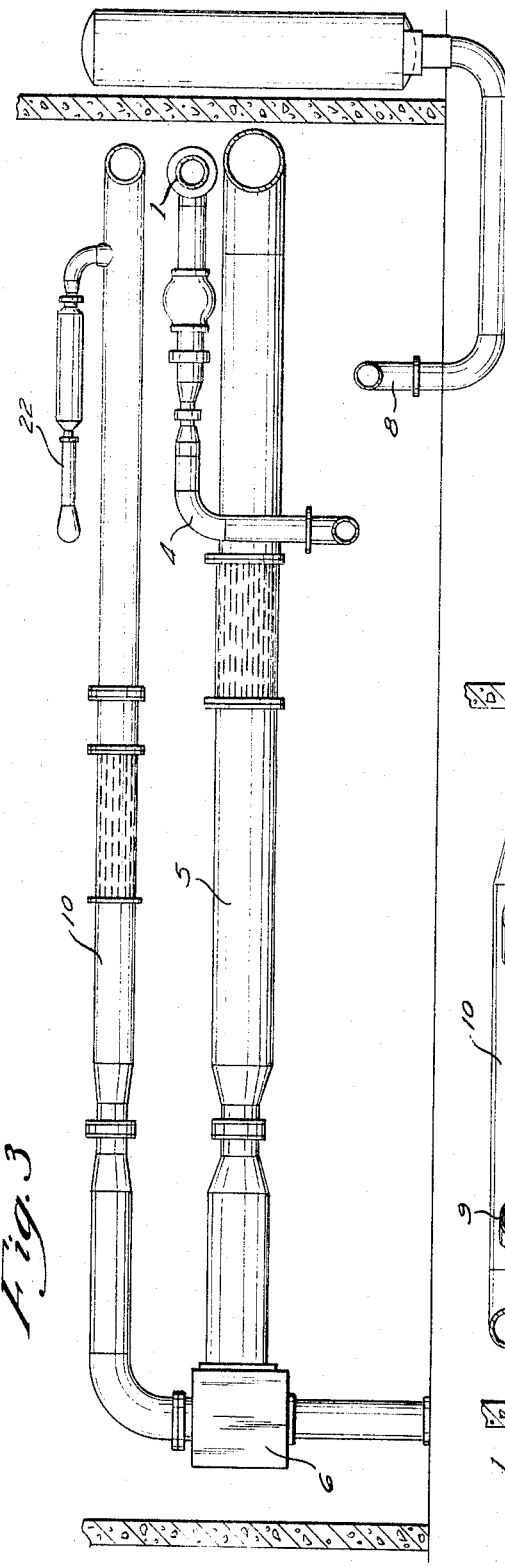
Figure 5:
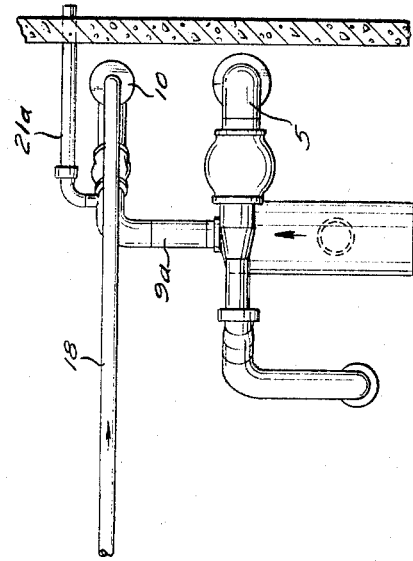
Figure 4:
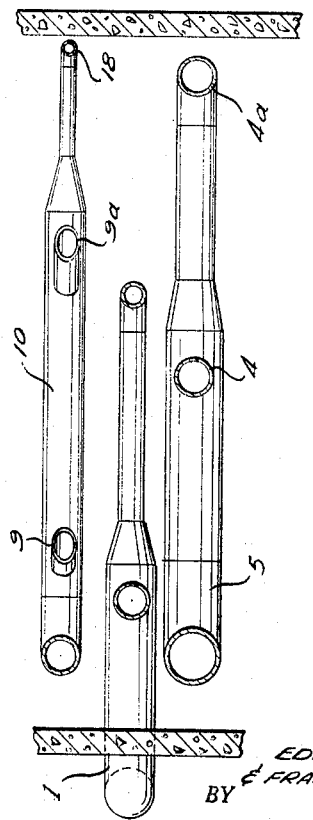
Figure 6:
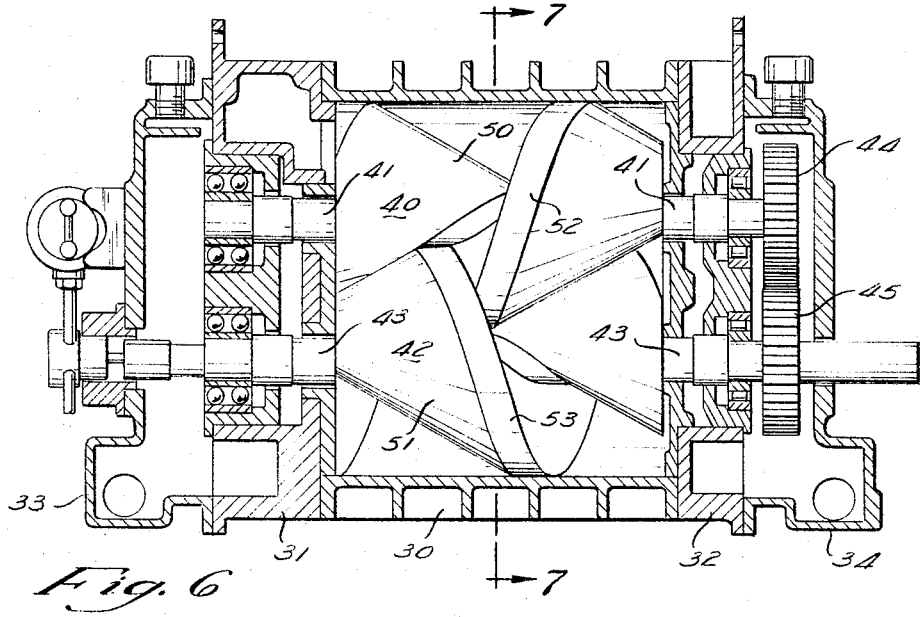
Figure 7:
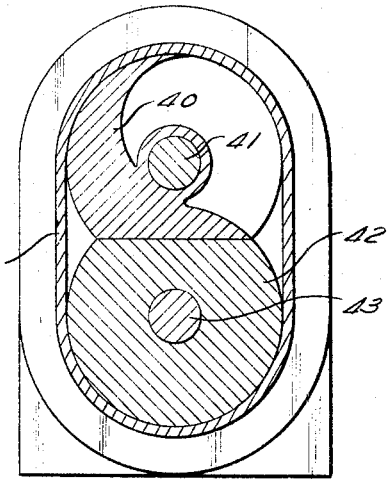
Figure 11:
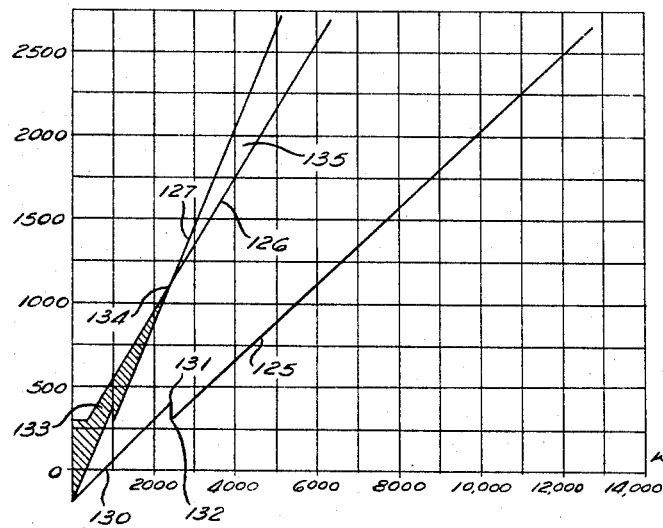
Figure 8:
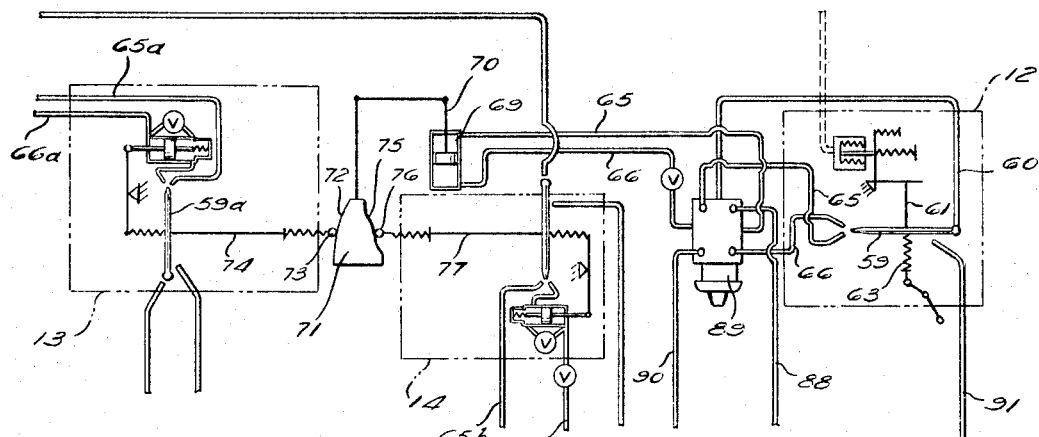
Figure 10:
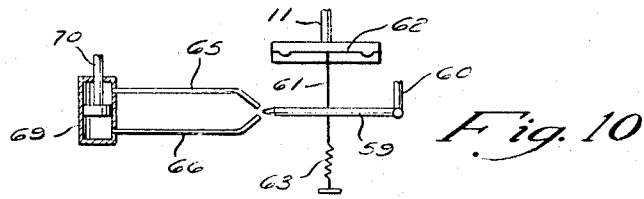
Figure 9:
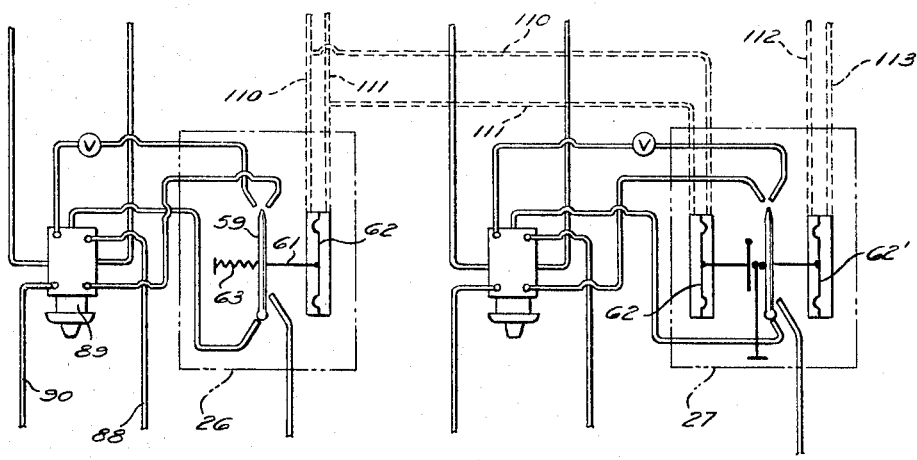

FIGURES 3, 4 and 5 are elevational views taken on lines 3—3, 4—4 and 5—5, respectively, of FIGURE 2;

FIGURE 6 is a vertical central sectional view, partly in elevation, of the device used for expanding or compressing a gas;

FIGURE 7 is a transverse sectional view taken on line 7—7 of FIGURE 6;

FIGURE 8 shows, diagrammatically, apparatus for regulating the gas pressure in the system of FIGURE 1;

FIGURE 9 shows, diagrammatically, means for controlling the ratio metering valves of FIGURE 1;

FIGURE 10 is a rudimentary diagrammatic view showing the pressure regulators employed in the apparatus of FIGURES 8 and 9; and, FIGURE 11 shows characteristic operational curves of the apparatus of FIGURES 1 to 10 at different rotor speeds and different gas and air volumes.

FIGURE 1 shows, diagrammatically, a system for carrying out the present invention. Natural gas at a predetermined pressure, for example 25 p.s.i.g. (pounds per square inch gauge), is brought into the system through line 1 and its pressure is reduced to about 15.0 p.s.i.g. in passing through the flow control valve 15. Then the gas is passed through an orifice plate 2 and into a first unit including an expander 3 with a further reduction in pressure to about 6 p.s.i.g. and is discharged through lines 4 and 5 into a mixing chamber 6. A rotor shaft of expander 3 is connected to a rotor shaft of a compressor 7. The power developed by the expansion of the high pressure gas in expander 3 drives compressor 7 which draws in air at atmospheric pressure through pipe 8, compresses it to a pressure of about 6 p.s.i.g. and discharges it through lines 9 and 10 into mixing chamber 6. The gas and air at the same pressures of about 6 p.s.i.g. mix in chamber 6 and the mixture is fed through line 11 to burners (not shown), with, or without, the addition thereto of coke oven gas at a pressure of about 6 p.s.i.g.

As will be explained later, this valve 15 is controlled by the pressure of the mixed gas in line 11 and, thereby, automatically adjusts the pressure of the natural gas flowing therethrough to whatever pressure is necessary to maintain the quantity of gas required in the mixed gas line 11. For example, the pressure of the gas leaving valve 15 will be about 12 p.s.i.g. when the rotors in expander 3 have a speed of below about 400 r.p.m. and the compressor is unloaded. As the compressor is being loaded, valve 15 will open to increase the gas pressure therethrough to about 15 p.s.i.g. so as to afford the demanded increase in power. It will be understood that the pressure of 25 p.s.i.g. in line 1 was chosen arbitrarily to give a constant pressure against valve 15 under the operating conditions of the described apparatus. Obviously, the pressure might be increased or decreased as desired depending on the particular set of operating conditions.

As the burners demand more or less of the mixed gas, the pressure in the mixed gas line 11 varies. These variations in pressure are sensed by pressure regulating means 12 and that means actuates flow regulator 13 and, through it, valve 15 which controls the supply of natural gas to the expander 3. Since the rotor of expander 3 is coupled to, and drives, the rotor of the compressor 7, the volume of compressed air varies with the velocity of the rotors of the expander.

A second expander-compressor unit, like the first unit just described is provided for use when more mixed gas is required than the first unit can supply. This second unit includes orifice plate 2a, expander 3a and line 4a to deliver natural gas into line 5 of the first unit. The second unit also includes a compressor 7a having an inlet line 8a and outlet line 9a for delivering compressed air into line 10. Regulating means 12 and regulator 14 control valve 15a of the second unit.

An auxiliary air compressor 16 is provided to expedite the starting up of the system, that is, until the rotors of the compressor have attained a speed high enough to supply air at the required pressure. Air enters compressor 16 through pipe 17 and is discharged through line 18 into line 10, check valves 19 and 19a in 9 and 9a serving to prevent back flow of compressed air into compressors 7 and 7a. Pipe 18 is provided with a relief valve 19b which opens when the air pressure reaches 6.5 p.s.i.g. Motor M is used to drive the compressor 16.

The expander compressor units are provided with speed sender and control mechanism 20 and 20a and vent valves 21 and 21a, respectively, which vent the air being compressed until the speed attains a high enough value to produce the desired pressure.

The compressed air line 10 is provided with a blow off line 22 and valve 22a, to allow the escape of air when its volume exceeds the predetermined amount.

The flow of gas and air in pipe lines 5 and 10 is measured through ratio metering valves 25 mechanically connected for concurrent movement and these valves are actuated by differential pressure regulator 26. Ratio regulator 27 is connected to the means 28 which actuates valve 22 to control the escape of excess air.

FIGURES 2 to 5 inclusive show a commercial installation of apparatus which embodies the system diagrammatically illustrated in FIGURE 1. In these three figures, parts like those shown in FIGURE 1 are designated by the same characters.

Any suitable apparatus may be used for the expander-compressor units of FIGURES 1 to 5, but each of the illustrated units includes two compressors which are being made and sold by Roots-Connersville Blower—a division of Dresser Industries, and are known as Spiraxial compressors. These compressors or blowers are, and have long been commonly known as, positive displacement or positive volume blowers since the displacement or volume of gas drawn in and, hence, discharged per revolution is fixed. A speed is selected to give the capacity or volume of gas wanted. The blower or compressor operates efficiently at all pressures and throughout substantially its entire designed speed range and delivers a constant volume of gas at a fixed speed. The blower works equally well for pressure or suction or a combination of both.

FIGURES 6 and 7 show the construction of one of those compressors. It comprises a housing 30 with end plates 31 and 32 which are provided, respectively, with passages for gas flow therethrough, and cover plates 33 and 34 which, together with plates 31 and 32, define chambers through which gas may flow into or out of the housing 30. Within housing 30 is positioned rotor 40 having an integral shaft 41 rotatably mounted in bearings in the end plates 31 and 32. Another rotor 42 is also positioned in housing 30 and has its integral shaft 43 rotatably mounted in the end plates 31 and 32. Meshing gears 44 and 45 connect shaft 41 and 43 for simultaneous rotation of the rotors 40 and 42 and shaft 43 projects through the cover plate 34 for connection to suitable driving means when the device is to be used as a compressor.

The rotors 40 and 41 are intermeshing screw rotors and are arranged for rotation in opposite directions. The spiral side surfaces 50 and 51 of these rotors maintain close, but definite, radial clearance between each other. Additionally, the spiral edge surfaces 52 and 53 of these rotors form a close, but definite, radial clearance between the rotors and the inner surface of housing 30.

In normal use as a compressor, the rotor shaft 43 is driven by power means (not shown) and air is drawn in through cover plate 34, is compressed by rotors 40 and 42 and is discharged through cover plate 33. However, the device may be used as a gas expander by admitting high pressure gas through plate 33. In flowing through housing 30, this gas will expand with resultant rotation of the rotors and will be discharged at lower pressure through plate 34.

When shafts 43 of two of these devices are connected together for concurrent rotation and gas under pressure is passed in through plate 33 and out through plate 34 of one device, the gas will rotate shaft 43 of that device and the latter will rotate shaft 43 of the other device. Thus, the high pressure gas which expands in the first device drives the rotors of the second device and atmospheric air drawn into the second device will be compressed therein and discharged through plates 31 and 33 thereof.

Any suitable apparatus may be employed for regulating the gas pressure in mixed gas pipe line 11. The means shown herein for that purpose includes the pressure regulator 12, flow regulators 13 and 14 and connections from these regulators to valves 15 and 15a.

While any suitable pressure regulator may be used, the one used in the herein disclosed apparatus is shown diagrammatically in FIGURE 10. It is marketed by GPE Controls, Inc. of Chicago, Illinois and is known as an Askania regulator. It includes a small open-ended pipe line 59 which is mounted for slight swinging movement and which is supplied with oil under pressure through line 60. The line 59 is urged in one direction by the rod 61 of a diaphragm device 62 which communicates with pipe line 11 and is responsive to pressure variations of the gas in that line; and is urged in the opposite direction by spring 63. Two tubes 65 and 66 are fixed in position with their open ends close to the open end of line 60 so that fluid discharged from line 59 may enter either or both of tubes 65 and 66. At their opposite ends, tubes 65 and 66 communicate with opposite ends of cylinder 69 in which is mounted a piston connected to piston rod 70. When the spring 63 and the diaphragm 62 are in balance, pipe 59 will discharge fluid equally into both tubes 65 and 66 and the piston will remain in whatever location it has last assumed. When pipe 59 is moved from such a central position and discharges more fluid into one of these tubes than into the other, the piston will be moved correspondingly.

The regulator of FIGURE 10 is shown as being included in the apparatus of FIGS. 1, 8 and 9 wherein like parts are identified by like reference characters. As FIGS. 8 and 9 show, the oil under pressure in line 59 is supplied by a pump (not shown) through line 88 and valve 89 which is also interposed to lines 65 and 66 and is connected by an oil drain line 90 to the pump reservoir. Oil which is discharged from pipe 59 and does not enter tubes 65 and 66 is collected and drained back to the pump reservoir through line 91.

Valve 89 is a "manual automatic" multi-channeled valve which is operated manually. When this valve is adjusted to the "auto" position, line 88 is connected to line 60, and lines 65 and 66, respectively, are in communication from the regulator to cylinder 69. When valve 89 is in the "neutral" positions, all the lines are shut off. In the "open" position, line 88 is connected through line 60 to cylinder 69 and line 90 is connected to line 65. In the "closed" position, line 88, is connected to line 65 and line 90 is connected to line 66. Thus, in these last two positions, the piston may be set manually to any position and the regulator is inoperative.

The rod 70 carries a cam 71 having a cam surface 72 which is engaged by the cam roller 73 on rod 74 of flow regulator 13 and an opposed cam surface 75 which is engaged by the cam roller 76 on rod 77 of flow regulator 14. As the gas pressure in line 11 varies and line 59 shifts to direct more fluid into one of tubes 65 and 66 than into the other, the piston will be shifted in cylinder 69 and cam 71 will be moved with resultant endwise movement of rod 74. This rod is attached to the movable tube 59a of another Askania regulator which has tubes 65a and 66a like tubes 65 and 66 of the first Askania regulator. These tubes 65a and 66a communicate with the ends of cylinder 80 in which a piston (not shown) is connected by linkage 82 to valve 15.

Cam surface 75 moves rod 77 after the cam 71 has moved rod 74 to its extreme position, that is, when valve 15 is wide open. Regulator 14 is like regulator 13 and is connected in like manner by way of tubes 65b and 66b, cylinder 80a and linkage 82a to valve 15a, in the line carrying natural gas to the auxiliary expander 3a. When there is a demand for more mixed gas in line 11 than the first expander compressor unit can supply, cam 71 is moved to open valve 15a and thus brings the second unit onto the line.

The ratio metering valves 25 and 25a of the gas line 5 and air line 10 are mechanically linked together by links 100 and 101 for simultaneous movement and are controlled by differential pressure regulator 26 which is actuated by the pressure drop of the gas in flowing through ratio metering valve 25 and by a piston in cylinder 102 which is connected by a link 103 to the valve connecting linkage. Regulator 26 and cylinder 102 are, respectively, like regulator 12 and cylinder 80, described above. A ratio regulator 27 controls the bleed valve 22a and, like regulator 26, is connected to line 10 so as to hold the air pressure drop at a constant ratio to the gas pressure drop.

FIGURE 9 shows details of the connections of regulators 26 and 27 and associated mechanism. The diaphragm 62 of regulator 26 is responsive to the differential gas pressure in line 5 at the points of attachment thereto of pipes 110 and 111 and these pressures are applied to diaphragm 62 of regulator 26. Regulator 27 is provided with a diaphragm 62' instead of a spring and that diaphragm is responsive to differential air pressures in line 10 through pipes 112 and 113. Lines 114 and 115 are connected to cylinder 28 and control air bleed off valve 22a.

FIGURE 11 shows curves which indicate the characteristics of an expander-compressor unit having a maximum capacity of 12,500 s.c.f.m. of natural gas, at various volumes of natural gas and compressed air.

Curve 125 indicates the volume of gas flow through the expander indicated by the abscissa, at different rotor speeds, indicated by the ordinates. Curve 126 similarly indicates the air compressed by the compressor at various rotor speeds. Curve 127 similarly indicates the volume of air required for different volumes of gas.

The rotors of the expander do not begin to rotate until the gas flow therethrough has reached about 900 s.c.f.m. (standard cubic feet per minute) which is indicated at the point marked 130 on curve 125. Then the rotors begin to rotate but no air will be compressed by the compressor until the rotors reach a speed of about 400 r.p.m. which is indicated at point 131 on curve 125. Air is supplied from the auxiliary compressor in the amount of 1000 s.c.f.m. of air for 2450 s.c.f.m. of gas, while the rotors are increasing to that speed. When the rotors reach a speed of 400 r.p.m. which is indicated at point 131, the compressor can begin to compress air. At this point the speed sender 20 will cause the vent valve 21 to close, and the compressor will be loaded. When the compressor becomes so loaded, the rotor speed will decrease to about 300 r.p.m. because of the increase in power used by the compressor after loading while the expander is passing the same volume of gas, namely, 2450 s.c.f.m. This decrease in speed is indicated at point 132. When the compressor is loaded at 300 r.p.m., the main compressor will begin supplying about 400 s.c.f.m. of air and the air supplied by the auxiliary compressor will be decreased from 1000 s.c.f.m. to 600 s.c.f.m. As the quantity of gas flow through the expander increases and the rotor speed increases, the auxiliary air load decreases, as is indicated at the area marked 133, until, at the rotor speed of 1150 r.p.m. which is indicated at point 134, the expander-compressor unit will be self-supporting. Above a rotor speed of 1150 r.p.m., the compressor will produce an excess amount of air as is indicated in the area marked 135 and this excess is bled off through blow off valve 22a of FIG. 1.

If the second expander-compressor unit is required, to produce the demanded quantity of mixed gas, the second unit may be started, for example, when the rotor speed of the first unit is 2500 r.p.m. The starting up of this second machine will be identically like that described above for the first machine except that since the first machine will be producing an excess of some 600 s.c.f.m. of air, this excess may be used and only about 400 s.c.f.m. will need be supplied by an auxiliary compressor while the rotors of the second unit are being brought up to the speed at which the second compressor will be loaded.

It will be understood from the foregoing descriptions that natural gas at, for example, 15 p.s.i.g., is brought into one, or both, of the expander-compressor units and after being reduced to a pressure of 6 p.s.i.g. with coincident compression of air to that pressure, the air and gas at this pressure are mixed in the mixing chamber and then this mixture, which may be mixed with another gas, for example coke oven gas, at the same pressure, is then burned. The composition of the gas, that is, the ratio of volume of natural gas to volume of air, is maintained at substantially a constant ratio by the controls described above; and the quantity of the mixed gas which is produced will be controlled by the described pressure regulating means.

When natural gas having 1040 B.t.u.'s per cubic foot and a specific gravity of 0.63 is mixed with air in the ratio of 71 volumes of the gas to 29 volumes of air, the mixed gas will have a heat value of 738 B.t.u.'s per cubic foot and specific gravity of .737. Since a typical coke oven gas has a heat value of 540 B.t.u.'s and a specific gravity of .395, it may be mixed directly with the thus diluted natural gas.

Gases are generally considered as being interchangeable as fuels when the same value is obtained by dividing their heating values by the square roots of their specific gravities. In this instance, the value obtained by dividing the B.t.u.'s of the mixed gas by the square root of its specific gravity is the same as the value described by dividing the B.t.u.'s of coke oven gas with the square root of its specific gravity as will be seen by the following equation:

$$\frac{738}{\sqrt{.737}} = \frac{540}{\sqrt{.395}}$$

The three gas mixtures may be used interchangeably in a variety of burners.

We have found that by reducing such natural gas from 15 p.s.i.g. to just above 6 p.s.i.g. by expansion in the above described expander-compressor, enough energy is released to compress the air necessary for producing the 71–29 ratio just mentioned. Thus, by coupling the two compressors so that the gas expands in one and causes the compression of air in the other and then bringing those gases together, a mixed gas can be produced which has the heat, pressure and specific gravity values required for interchangeability with coke oven gas, and, consequently, can be burned just like coke oven gas and can be mixed with coke oven gas and the mixture may be burned.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. The method of mixing gases which comprises the steps of passing a high pressure gas through a single, continuously variable volume valve means, expanding said gas in a chamber and discharging the gas at a lower, predetermined, constant pressure into a mixing chamber having an outlet conduit, utilizing the energy released by the expansion of the high pressure gas to draw a lower pressure gas into a chamber, compress it therein to a higher, predetermined, constant pressure and discharge it into said mixing chamber, maintaining substantially constant the predetermined ratio of the gases flowing into said mixing chamber by venting excess compressed gas, maintaining substantially constant the pressure drop in the gases flowing to said mixing chamber, withdrawing mixed gases from said mixed chamber in widely varying volumes and controlling the volume of said high pressure gas passing through said valve means in accordance with variations in the pressure of gases in said mixing chamber and thereby varying the volume of gases discharged into said mixing chamber in direct proportion to the volume of gases withdrawn therefrom.

2. The combination of steps set out in claim 1 in which natural gas is the high pressure gas and air is the lower pressure gas and the mixed gases are interchangeable with coke oven gas.

3. The combination of steps set out in claim 1 in which the natural gas has a B.t.u. value of about 1040 and a specific gravity of about 0.63 and its pressure is decreased from about 15 p.s.i.g. to 6 p.s.i.g. in said chamber and the air is increased from about atmospheric pressure to about 6 p.s.i.g. in said chamber.

4. The combination of steps set out in claim 3 in which the mixed gas has a B.t.u. value of about 738, a specific gravity of about .737 and a ratio of about 71 volumes of the reduced pressure natural gas to about 29 volumes of the compressed air.

5. Means for continuously producing a mixture of an initially low pressure gas, and an initially relatively high pressure gas in a varying volume output and at a constantly maintained predetermined ratio and at a constantly maintained pressure, which comprises:
   (a) a positive displacement gas compressor to compress a low pressure gas,
   (b) a positive displacement gas expander connected to said compressor to actuate the latter,
   (c) a single valve adjustable between fully opened and fully closed positions to admit relatively high pressure gas into said expander in volumes up to substantially the full operating capacity of said expander,
   (d) a mixing chamber,
   (e) conduits connecting the outlets from said expander and said compressor to said chamber to conduct the said gases separately to said chamber,
   (f) metering valves in said conduits and connected together for concurrent movement for maintaining substantially constant the pressure drop across said valves under varying volume of gas flow in said conduits,
   (g) means to maintain substantially constant the predetermined ratio of the gases to each other including means connected to the compressed gas conduit for venting gas therefrom and actuated by the ratio of pressure drops across the metering valves, and
   (h) means responsive to variations in the volume of gases withdrawn from the mixing chamber to adjust said single valve to vary the volume of gas admitted to the expander and thereby to maintain the predetermined pressure of said mixed gases in the mixing chamber.

6. The combination of elements set forth in claim 5 in which each compressor and each expander has a rotor and the rotor of the expander is coupled to the rotor of the compressor to actuate the latter.

7. The combination of elements set forth in claim 5 in which the means for venting gas from the compressed gas conduit includes a valve to vent gas out of said conduit and means for actuating said valve including regulators responsive to differential pressures in the conduits from the expander and from the compressor.

References Cited by the Examiner

UNITED STATES PATENTS

| 1,452,265 | 4/1923 | Collins et al. | 137—7 |
| 2,637,638 | 5/1953 | Schmidt | 48—180 |
| 2,740,701 | 4/1956 | Tenney | 48—190 |
| 2,992,084 | 7/1961 | Schropp | 48—180 |

OTHER REFERENCES

Chemical Engineering Catalog, pp. 1586–7 (1956–57), Reinhold Publishing Corp., N.Y.

MORRIS O. WOLK, *Primary Examiner.*

JOSEPH SCOVRONEK, *Examiner.*